May 13, 1924.
P. RUSSELL ET AL
MOTOR REGULATING DEVICE
Filed July 19, 1923
1,494,189
4 Sheets-Sheet 1
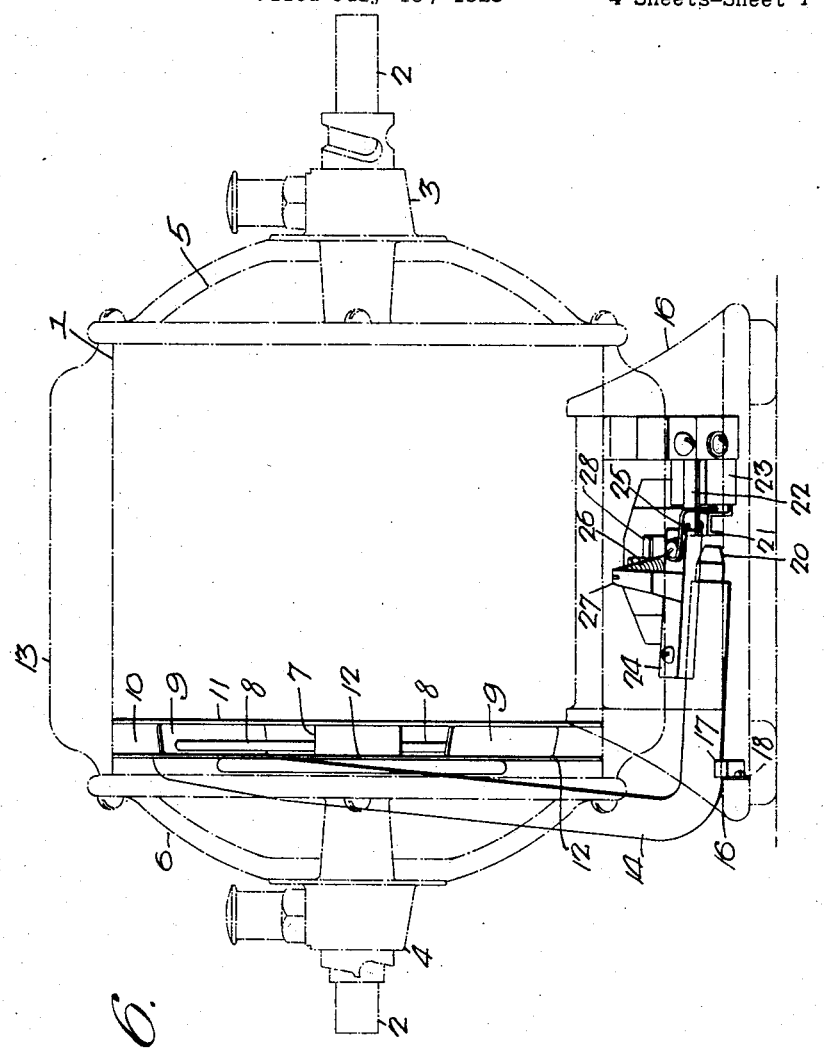
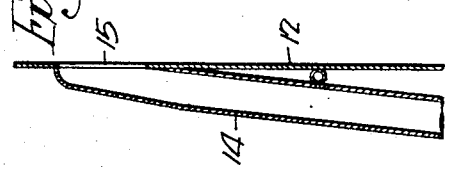
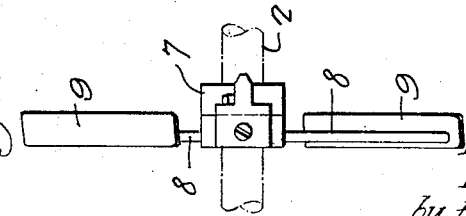
Inventors.—
Edward Burke Wilford,
Percy Russell
by their Attorneys.—
Howson & Howson May 13, 1924.
P. RUSSELL ET AL
MOTOR REGULATING DEVICE
Filed July 19, 1923
4 Sheets-Sheet 2
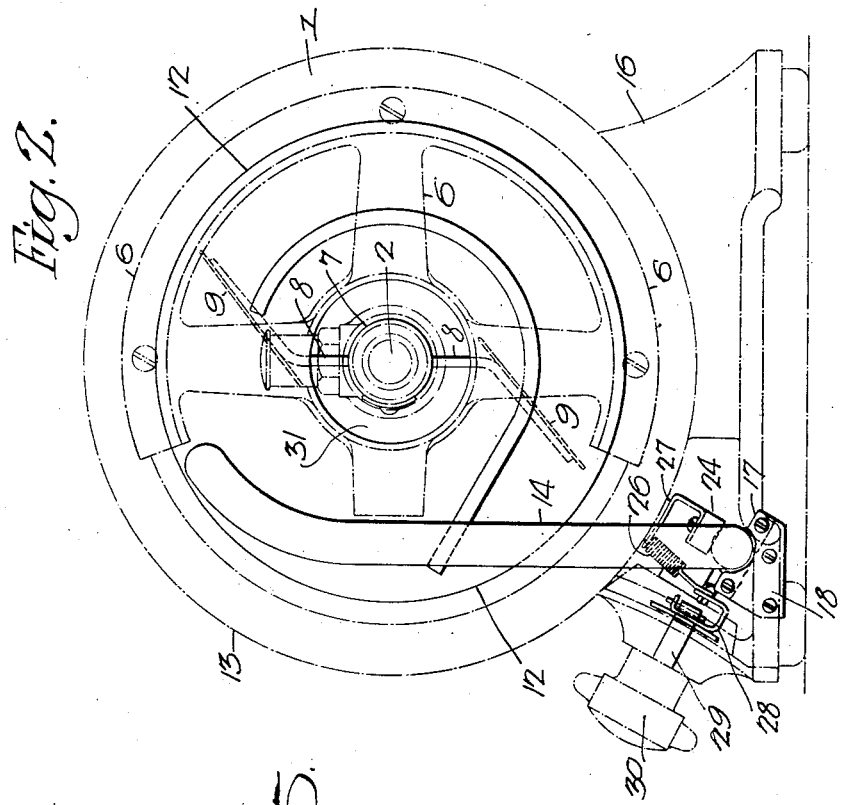
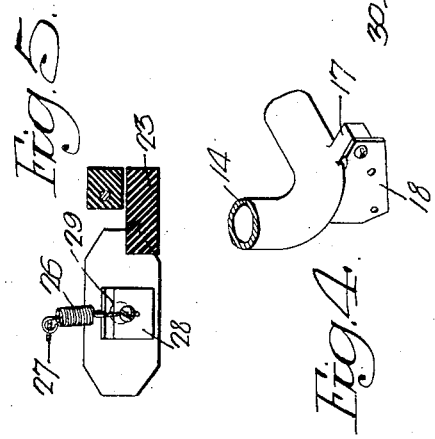
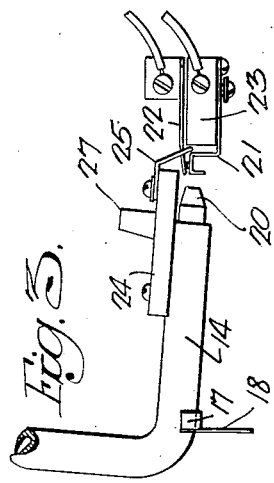
Inventors:
Edward Burke Wilford,
Percy Russell,
by their Attorneys
Howson & Howson

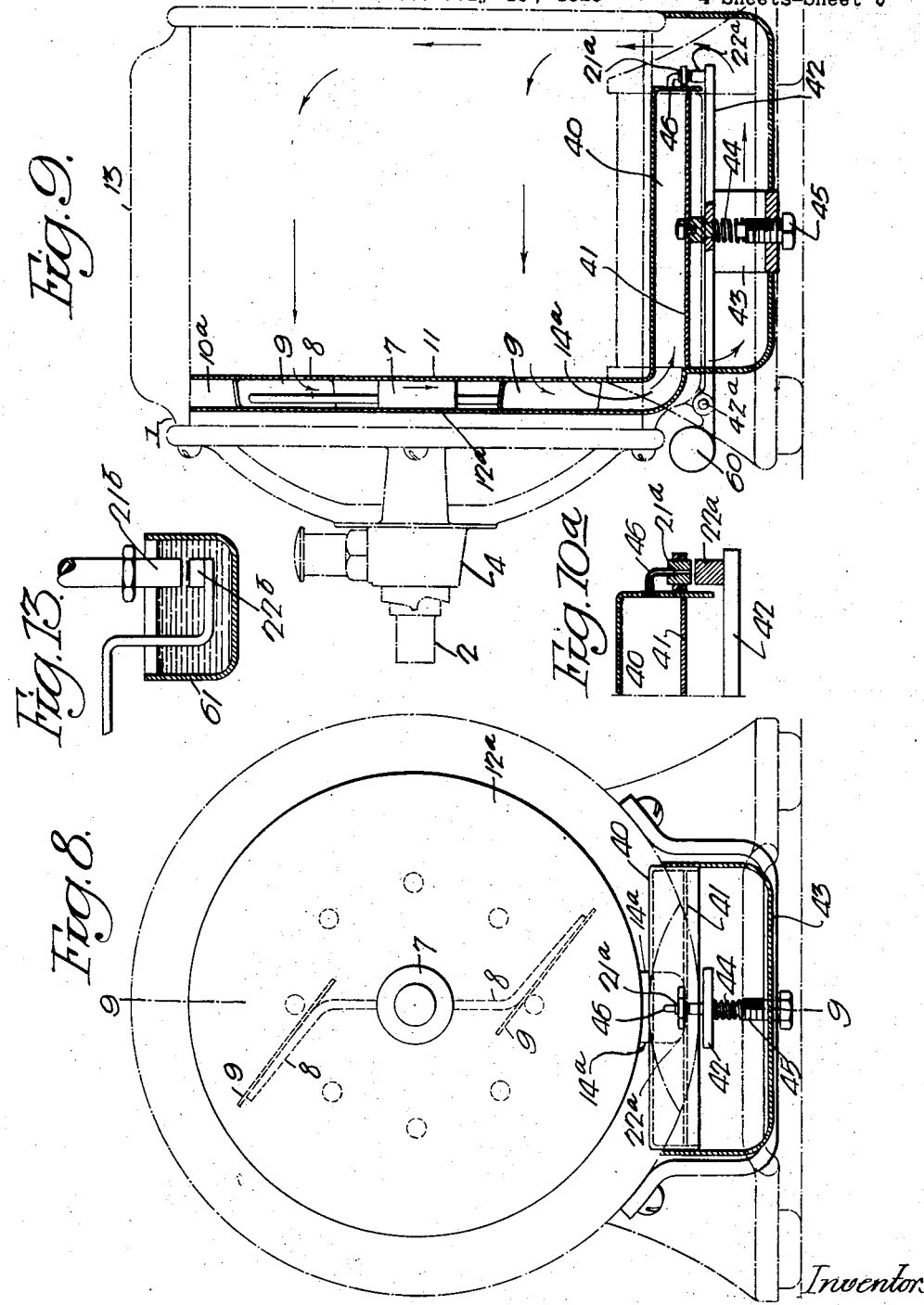

May 13, 1924.
P. RUSSELL ET AL
MOTOR REGULATING DEVICE
Filed July 19, 1923
1,494,189
4 Sheets-Sheet 4
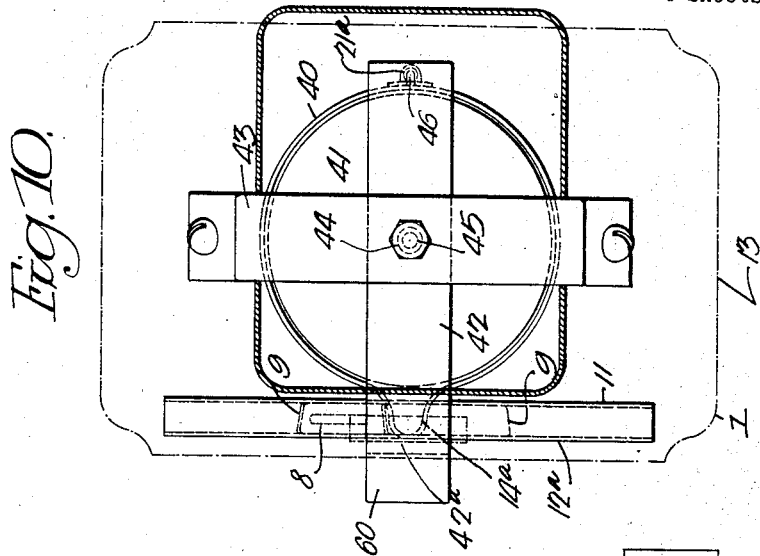
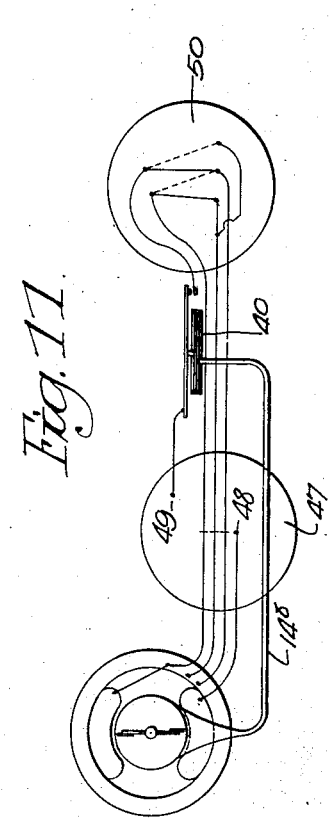
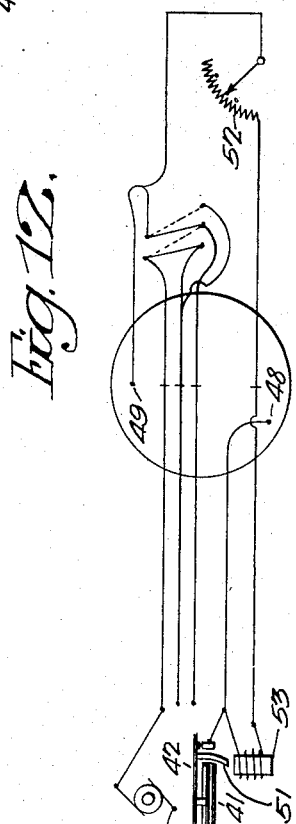
Inventors.
Edward Burke Wilford,
Percy Russell,
by their Attorneys.
Howson & Howson.

Patented May 13, 1924.

1,494,189

UNITED STATES PATENT OFFICE.

PERCY RUSSELL, OF SWARTHMORE, AND EDWARD BURKE WILFORD, OF MERION, PENNSYLVANIA, ASSIGNORS TO ELECTRO DENTAL MANUFACTURING COMPANY, OF PHILADELPHIA, PENNSYLVANIA, A CORPORATION OF PENNSYLVANIA.

MOTOR-REGULATING DEVICE.

Application filed July 19, 1923. Serial No. 652,568.

*To all whom it may concern:*

Be it known that we, PERCY RUSSELL and EDWARD BURKE WILFORD, citizens of the United States, residing, respectively, in Swarthmore and in Merion, Pennsylvania, have invented a Motor-Regulating Device, of which the following is a specification.

One object of this invention is to provide novel means for controlling an electric motor whereby it may be caused to run at a substantially or practically constant speed at all loads from zero to full load.

It is further desired to provide a regulating device for a motor which shall be independent of the electrical and magnetic changes which may occur in said motor or in the circuit associated therewith,—the invention contemplating novel adjusting means whereby the motor may be made to maintain different speeds at will.

We also desire to provide a novel combination of parts for utilizing a fluid actuated device such as an air pressure or suction device to control the speed of an electric motor, together with an electric switch actuated by said device, preferably though not necessarily in combination with means whereby damage from burning of the contacts of said switch is minimized.

A further object of our invention is to provide a novel combination of an electric motor with an electric switch and mechanism whereby said switch is intermittently actuated to successively make and break the circuit of said motor in such manner as to maintain its rotary element at a substantially constant speed.

These objects and other advantageous ends we attain as hereinafter set forth, reference being had to the accompanying drawings, in which, Figs. 1 and 2 are respectively a side and an end elevation of an electric motor showing our invention as applied thereto;

Fig. 3 is an elevation illustrating the electric switch and one form of air jet nozzle associated therewith;

Fig. 4 is a perspective view illustrating one form of support for the air conduit forming part of our invention;

Fig. 5 is an elevation, partly in section, illustrating the construction and support for the tension-adjusting means;

Fig. 6 is a longitudinal section of a portion of the air conduit and its associated diaphragm;

Fig. 7 is a side elevation of the fan or rotor forming part of our invention;

Fig. 8 and 9 are respectively an end elevation and a vertical section on the line 9—9, Fig. 8, illustrating a modified form of our invention;

Fig. 10 is an inverted plan of a detail of the device of Figs. 8 and 9;

Fig. 10ª is a section showing the detail construction of one form of the air cooling attachment for the contacts;

Figs. 11 and 12 are diagrams illustrative of two forms of our invention; and,

Fig. 13 is a vertical section illustrating a special device for preventing burning of the switch contacts.

In the above drawings, we have illustrated in dot and dash lines a well known form of electric motor 1 having an armature shaft 2 supported in bearings 3 and 4 formed as part of two heads 5 and 6, respectively. In accordance with our invention, we mount on said armature shaft, preferably between the body of the motor and one of the heads, a fan or air pump rotor (Fig. 7) consisting in the present instance of a sleeve 7 carrying oppositely extending arms 8—8, respectively supporting vanes or blades 9—9. This rotor turns within a chamber 10 defined by a relatively fixed partition 11 adjacent one end of the motor armature and a movable partition or diaphragm 12 parallel therewith and made in the form of a circular plate of sheet metal—the frame or casing 13 of the motor extending around and forming the cylindrical wall of this chamber. The movable partition or diaphragm 12 is supported by an air conduit 14 bent in the present instance to have an angular form and fulcrumed in any suitable manner on the motor structure. In the case illustrated, the upper end of said conduit communicates with the chamber 10 through an opening 15 in the diaphragm 12, and extends downwardly from said diaphragm to the base 16 of the motor, adjacent which it is provided with laterally projecting lugs 17 fulcrumed through a plate or strip of flexible sheet metal 18 fastened to the base 16. Said conduit 14 has the form of a bell crank lever on whose upwardly projecting arm the diaphragm 12 is carried so as to be capable of moving bodily toward and from the fixed partition 11 under the action of air under pressure in the chamber 10.

As shown in Fig. 3, the lower and substantially horizontal end of the conduit 14 terminates in a nozzle 20 positioned to direct an air jet upon a pair of contact members 21 and 22, constituting an electric switch operatively associated with the motor 1. These contacts in the present instance are mounted on a block 23 of insulating material and one of them at least, as that indicated at 22, is made of spring material or is resiliently supported so that it tends to move toward and remain in engagement with contact 21. The end of the conduit 14 adjacent the nozzle 20 has mounted upon it a piece 24 carrying a suitably insulated arm or finger 25, positioned to so cooperate with the contact 22 that when said conduit moves with the diaphragm 12 and swings on its fulcrum away from the partition 11, said arm will move the contact 22 out of engagement with the contact 21, thus breaking the motor circuit. On the other hand, the parts are so arranged that when the air pressure in the chamber 10 is below a predetermined amount, the diaphragm 12 tends to move toward the partition 11. This movement is assisted to any desired extent by a spring 26, one end of which is connected to an arm 27 on the piece 24 while its other end is attached to an arm 28 fixed to a spindle 29. The latter is journaled in a suitable portion of the base structure 16 and its outer end is provided with an adjusting head 30 whereby it may be rotated to vary the tension of the spring 26.

In the above described arrangement of parts, the contacts 21 and 22 are normally in engagement so that when no current is flowing, the motor circuit is closed. As soon therefore as current is supplied to said circuit, the motor armature and hence the shaft 2 with the fan blades 9 are rotated, and if the motor be of the series type, the speed of said armature if said motor is unloaded, tends to increase indefinitely. The rotation of the blades 9, however, causes air to be drawn into the chamber 10 through the central opening 31 of the diaphragm 12 and to be compressed within said chamber so that diaphragm 12 is moved away from the partition 11,—the conduit 14 turning on its fulcrum to permit of this action.

Such turning of said conduit, through the arm 25, moves the contact 22 out of engagement with the contact 21, thus breaking the circuit of the motor. The armature of the latter therefore at once begins to slow down, and when its speed falls to such a point that the air pressure in the chamber 10 permits the diaphragm 12 to move toward the partition 11, the contact 22 again engages the contact 21. The motor circuit is thus again completed and the speed of the armature is increased, until as before, the air pressure in the chamber 10 causes the contacts 22 and 21 to be separated. The current is thus alternately supplied to and cut off from the motor so that its armature is positively driven for a greater or less time depending upon the tension of the spring 26, as determined by the adjustment of the head 30;— it being obvious that when this latter is so turned as to decrease the tension of said spring, the motor circuit remains open for a greater proportion of the time and hence the speed of said motor is lower under conditions of operation. We have found that under working conditions the diaphragm 12 oscillates with sufficient rapidity to maintain the speed of the motor practically constant and by adjusting the spring 26, it is possible to change the time the circuit remains closed so that in a typical case, it is possible to operate the motor at any speed from 500 R. P. M. to 5,000 or more R. P. M.; the speed of the motor under constant load depending upon the time the motor circuit is closed during a given period.

Owing to the fact that the conduit 14 opens into the chamber 10, air under pressure is delivered therefrom through the nozzle 20 upon the contacts 21 and 22, so that the contacts are maintained at such a low temperature that they are not materially injured by the alternate opening and closing of the motor circuit.

In Figs. 8, 9 and 10, we have shown a form of our invention in which the rotating element of the motor as before drives or has attached to it the fan elements 9—9 operative in a chamber 10$^a$ defined by two fixed partitions 11 and 12$^a$ and a portion of the motor frame. A conduit 14$^a$ leads from this chamber to a cylinder 40 in the form of a flattened casing mounted in the present instance in the base of the motor under the body thereof. In the cylinder is a piston in the form of a plate or disc 41 attached to and in the present instance supported by an arm 42 pivoted at 42$^a$ to a suitable lug projecting from the frame of the motor and counterbalanced by a suitable weight 60 so that gravity will not affect operation of the device. The opposite end of said arm carries a contact 22$^a$ positioned to co-act with a fixed contact 21$^a$ carried by and suitably insulated from the cylinder 40 or other supporting structure. By any suitable means such as a yoke 43 extended under the cylinder 40, we support a spring 44 and an adjusting screw 45 so that the arm 42 and consequently the contact 22$^a$ is pressed toward the contact 21$^a$, and the piston 41 is pressed toward the upper part of the cylinder 40.

With this arrangement of parts, the operation of the motor as before causes the fan blades 9—9 to compress air in the fan chamber and in the present instance this air is delivered into the cylinder 40 where it acts on the piston 41. When the speed of the motor is such as to raise the air pressure in said cylinder sufficiently to overcome the force of the spring 44, the piston 41 is moved outward in the cylinder so that the contacts 22ª and 21ª are separated, thus breaking the electric circuit in which the motor is included or with which it is associated. Consequently the speed of the motor and hence the pressure of the air in the cylinder is at once diminished, whereupon the spring 44 acts to bring the contact 22ª into engagement with the contact 21ª. When this occurs, current again flows to the motor, causing a building up of pressure in the cylinder, an outward movement of the piston 41, and separation of the contacts. As before, there is thus an alternate making and breaking of the motor circuit which under practical conditions causes the speed of the rotary element of said motor to be maintained practically constant and at a rate which may be regulated by adjustment of the spring 44. In order to prevent burning of the contacts as well as to keep these cool, one of them as 21ª is preferably formed with an air passage therein and this is connected through a conduit 46 with the cylinder 40 so that a jet of air is delivered between said contacts. This detail may, however, be omitted without departing from our invention or if desired we may immerse the contacts in or surround them by some inert fluid such as nitrogen, transformer oil, etc., and in Fig. 13 we have shown said contacts as within an oil container 61 whereby they are cooled and prevented from objectionable burning.

It is to be understood that the motor-controlling contacts and the air actuated device for alternately closing and opening them without departing from our invention, may be placed at a distance from the motor structure, rather than in or immediately adjacent the same as shown in Figs. 1 to 10, inclusive. Thus in Fig. 11, we have shown the cylinder 40 as mounted at a distance away from the motor but connected with the fan chamber thereof by a suitable conduit 14ᵇ. In this figure, we have shown the motor diagrammatically and as associated with a wall box 47 in which are mounted terminals 48 and 49 for the attachment of current supply means. In this case, the direction of rotation of the motor is controlled by a reversing switch diagrammatically illustrated at 50.

In place of an adjustable spring for controlling the operation of the contacts and hence regulating the speed of the motor, we may employ a magnetic device such as that illustrated in Fig. 12. Such a device includes an armature 51 connected to the oscillatory arm 42 and extended adjacent an electromagnet 53, in the present instance shown as connected in series with a current varying device such as a rheostat 52, across the supply terminals 48 and 49. By adjusting said rheostat it is possible to vary the force exerted upon the armature 51 and hence on the piston 41 with the result of also adjusting the speed at which the motor is operated.

From the above description, it will be appreciated that by a relatively simple and inexpensive means, we are enabled to regulate the speed of an electric motor through a wide range, and when desirable, to utilize the air compressed by the operation of the motor, to prevent burning of the contacts, whose alternate engagement and disengagement are relied upon to maintain the motor in operation at the desired speed.

In Fig. 9 the motor body, the fan compartment, the cylinder containing the diaphragm or piston and the compartment containing the contacts are connected by passageways or chambers so as to form one continuous closed system. This construction prevents entrance of dust and keeps down the temperature of the motor by distributing the heat generated throughout the apparatus, the air propelled following the general course indicated by the arrows in Fig. 9.

We claim:

1. The combination with an electric motor of an electric switch for controlling said motor; an air compressing device actuated by the motor; and means operated by air from said device for alternately opening and closing said switch while the motor is in operation to maintain the motor speed substantially constant.

2. The combination with an electric motor of an electric switch for controlling said motor; an air compressing device actuated by the motor; and means operated by air from said device for alternately opening and closing said switch while the motor is in operation to maintain the motor speed substantially constant; with means for maintaining the contacts of said switch in an inert fluid.

3. The combination with an electric motor of an electric switch for controlling said motor; an air compressing device actuated by the motor; means operated by air from said device for alternately opening and closing said switch while the motor is in operation to maintain the motor speed substantially constant; and a device for adjusting said switch-actuated means to vary the motor speed.

4. The combination in an electric motor of a casing having a movable member; a rotary element driven by the motor for propelling air to move said member; an electric switch operatively associated with the movable member and in circuit with the motor; and means operative on the movable wall of the casing to cooperate with the air propelled by the motor for alternately opening and closing the switch while the motor is in operation.

5. The combination of an electric motor having a rotary element; an air propelling member actuated by said element; a casing having a movable member; a conduit for directing air from said propelling member against said movable member; and an electric switch in circuit with the motor mounted to be alternately opened and closed by movement of said member when the motor is operated.

6. The combination with an electric motor; a fan associated therewith; a fan member operative by the motor within said casing; an electric switch in circuit with the motor; and operating mechanism for said electric switch adapted to be actuated by air from said casing, whereby the motor may be operated at substantially constant speed.

7. The combination with an electric motor; of a fan casing associated therewith; a fan member operative by the motor within said casing; an electric switch in circuit with the motor; operating mechanism for said switch adapted to be actuated by air from said casing to maintain the motor in operation at a substantially constant speed; with means for delivering air from the casing upon said switch.

8. The combination with an electric motor; a fan casing associated therewith; a fan member operative by the motor within said casing; an electric switch in circuit with the motor; operating means for said switch adapted to be actuated by air from said casing to maintain the motor in operation at a substantially constant speed; with means for delivering air from the casing through one of the contacts of said switch.

9. In combination, a cylinder having a movable member; a motor; means for exerting a pressure on said movable member proportional to the speed of said motor; an electric switch in circuit with the motor including a movable contact connected to said movable member; with means acting upon the movable member in opposition to said first-mentioned means to cause the alternate opening and closing of the switch when the motor is in operation.

10. The combination with an electric motor; of a fan actuated thereby; a cylinder having a movable wall; means for causing said movable wall to respond to variations in the speed of said fan; an electric switch in circuit with the motor including a movable contact connected to said movable wall; means acting upon the movable wall in opposition to said first-mentioned means to cause the alternate opening and closing of the switch when the motor is in operation; with means for directing air from the fan upon the contacts of said switch.

11. The combination of an electric motor; a fan member propelled by the rotary element of said motor; a casing for said fan member; a cylinder connected to said casing and including a movable wall; an electric switch having one of its contacts connected to said movable wall; and a spring operative on the wall to cause oscillation thereof and alternate opening and closing of the switch when the motor is in operation.

12. The combination of an electric motor; an air impelling device actuated by the motor; an electric switch actuated by air from said device for controlling the flow of current to the motor and maintaining it in operation at a substantially constant speed; with means for causing the air impelled by the device to circulate through the motor.

13. The combination of a motor; an air impelling device actuated thereby; a cylinder having a movable wall and connected to receive air from said device; a counterbalancing weight for said wall; and an electric switch for controlling the motor having its movable contact actuated by said movable wall.

PERCY RUSSELL.
EDWARD BURKE WILFORD.